(12) United States Patent
Mathias et al.

(10) Patent No.: US 10,187,760 B2
(45) Date of Patent: Jan. 22, 2019

(54) DELIVERY OF MESSAGES IN A MULTI DEVICE CONFIGURATION

(71) Applicant: Apple Inc., Cupertino, CA (US)

(72) Inventors: Arun G. Mathias, Los Altos, CA (US); Rafael L. Rivera-Barreto, Santa Clara, CA (US); Rohan C. Malthankar, San Jose, CA (US); Teck Yang Lee, Cupertino, CA (US); Vikram B. Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 15/272,912

(22) Filed: Sep. 22, 2016

(65) Prior Publication Data

US 2017/0111915 A1    Apr. 20, 2017

Related U.S. Application Data

(60) Provisional application No. 62/242,857, filed on Oct. 16, 2015.

(51) Int. Cl.
*H04W 4/12* (2009.01)
*H04L 29/06* (2006.01)
*H04W 72/10* (2009.01)

(52) U.S. Cl.
CPC ........... *H04W 4/12* (2013.01); *H04L 65/1016* (2013.01); *H04W 72/10* (2013.01)

(58) Field of Classification Search
None
See application file for complete search history.

(56) References Cited

U.S. PATENT DOCUMENTS

| 7,620,408 | B2 | 11/2009 | Ye et al. |
| 8,554,858 | B2 | 10/2013 | Ye et al. |
| 8,750,909 | B2 | 6/2014 | Fan et al. |
| 2007/0294446 | A1* | 12/2007 | Nagao ................. G06F 13/3625 710/110 |
| 2009/0225746 | A1* | 9/2009 | Jackson ................. H04L 47/10 370/352 |
| 2010/0009704 | A1* | 1/2010 | Fan ...................... H04L 65/1006 455/466 |
| 2010/0115111 | A1* | 5/2010 | Varga ...................... H04L 51/30 709/228 |

(Continued)

*Primary Examiner* — Kodzovi Acolatse
(74) *Attorney, Agent, or Firm* — Meyertons Hood Kivlin Kowert & Goetzel, P.C.; Jeffrey C. Hood; Matthew C. Washburn

(57) ABSTRACT

Some embodiments relate to a cellular network which facilitates transmission of messages, such as SMS or MMS messages, to/from respective user equipment (UE) devices of a user. Each of the UE devices may provide a relative priority value indicating a priority for receipt of messages relative to the other UE devices associated with the user. When a message intended for the user is received at the cellular network, the priority information associated with each of the user's at least two UE devices may be retrieved. The message may then be selectively delivered (by the cellular network) to one of the first UE device or the second UE device based on the relative values of the first priority value and the second priority value. If a delivery attempt fails to the highest priority device, the cellular network may attempt to deliver the message to the second highest priority UE device.

17 Claims, 10 Drawing Sheets

(56) References Cited

U.S. PATENT DOCUMENTS

| | | | |
|---|---|---|---|
| 2011/0216701 A1* | 9/2011 | Patel | H04L 65/1016 370/328 |
| 2011/0319075 A1 | 12/2011 | Sharma et al. | |
| 2012/0213132 A1* | 8/2012 | Kim | H04W 48/18 370/310 |
| 2013/0310088 A1* | 11/2013 | Wong | H04W 4/14 455/466 |

* cited by examiner

DELIVERY OF MESSAGES IN A MULTI DEVICE CONFIGURATION

PRIORITY INFORMATION

This application claims priority to U.S. provisional patent application Ser. No. 62/242,857, entitled "Improved Delivery of Messages in a Multi Device Configuration," by Arun G. Mathias, et al., filed Oct. 16, 2015, which is hereby incorporated by reference in its entirety as though fully and completely set forth herein.

TECHNICAL FIELD

The present application relates to wireless devices, and more particularly to an apparatus, system, and method for providing improved delivery of messages, such as SMS or MMS messages, to a user in situations where the user utilizes multiple devices.

DESCRIPTION OF THE RELATED ART

The use of wireless communication systems is rapidly expanding. As wireless communication devices proliferate, users often own and operate multiple devices which may perform overlapping functions. For example, a user may own two or more of a smart phone, a tablet device, a portable computer, and a wearable device such as a smart watch, among other possible devices. As one common example, a user may carry and use a smart phone along with one or more other companion devices, such as a tablet or portable computer. The user may place/receive voice calls and/or IMS calls and also send and/or receive messages, such as text (SMS—Short Message Service) or multimedia (MMS—Multimedia Messaging Service) messages, on any of these devices.

To accommodate these various devices, carrier networks may support various multi-device features. For example, as part of IP messaging, networks may deploy features that enable an application server to distribute (or "fork") a message to each of an individual's registered devices. However, improvements in the field are desired.

SUMMARY

In light of the foregoing and other concerns, some embodiments relate to providing improved delivery of messages, such as SMS or MMS messages, to a user in situations where the user utilizes multiple devices.

A user equipment (UE) (device) may include a radio for performing wireless cellular communications with a network, and at least one processing element coupled to the radio. The UE may be capable of receiving messages, such as SMS or MMS messages, from the network. The UE may be associated with a user, and at least one other UE may also be associated with the user, the at least one other UE also being capable of receiving the messages from the network. The UE may be configured to transmit to the network, via the radio, a request to perform IP Multimedia Subsystem (IMS) registration. The request to perform the IMS registration may include a priority value, where the priority value indicates a priority for receipt of messages relative to the at least one other UE associated with the user. The UE may be further configured to receive at least one message from the network based on the priority value provided to the network.

In one exemplary method performed by a cellular network, first and second requests to perform IP Multimedia Subsystem (IMS) registration may be received from first and second user equipment (UE) devices belonging to a user. The first IMS registration request, made by the first UE device, may include a first priority value for receipt of messages intended for the user, and the second IMS registration request, made by the second UE device, may include a second priority value for receipt of messages intended for the user. The first priority value and the second priority value may be stored, e.g., in a memory medium in the network.

A message intended for the user may be received at the cellular network, and in response, the priority information associated with each of the user's at least two UE devices may be retrieved. The message may then be selectively delivered (by the cellular network) to one of the first UE device or the second UE device based on the relative values of the first priority value and the second priority value.

The cellular network may attempt to first deliver the message to the first UE device using an IMS messaging service if the first priority value is higher than the second priority value. In response to failure of this attempted IMS messaging service delivery, the network may attempt to deliver the message to the first UE device over a circuit-switched network or using a serving gateway. If these delivery attempts fail, the cellular network may attempt to deliver the message to the second UE device, which has the lower priority relative to the first UE device.

Upon successful delivery of the message to the second UE device, the cellular network may temporarily adjust the relative priority values such that the second UE device has a higher priority than the first UE device. Thus the cellular network may attempt to provide subsequent messages first to the second UE device for a period of time. For example, the cellular network may attempt to provide subsequent messaging service messages first to the second UE device for the remainder of the current "conversation", e.g., until a message intended for the user has not been received by the network for a predetermined period of time.

Accordingly, embodiments are presented herein of a method for improved delivery of messages in a multi device configuration (system), and cellular networking hardware and/or a UE configured to implement the method. This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
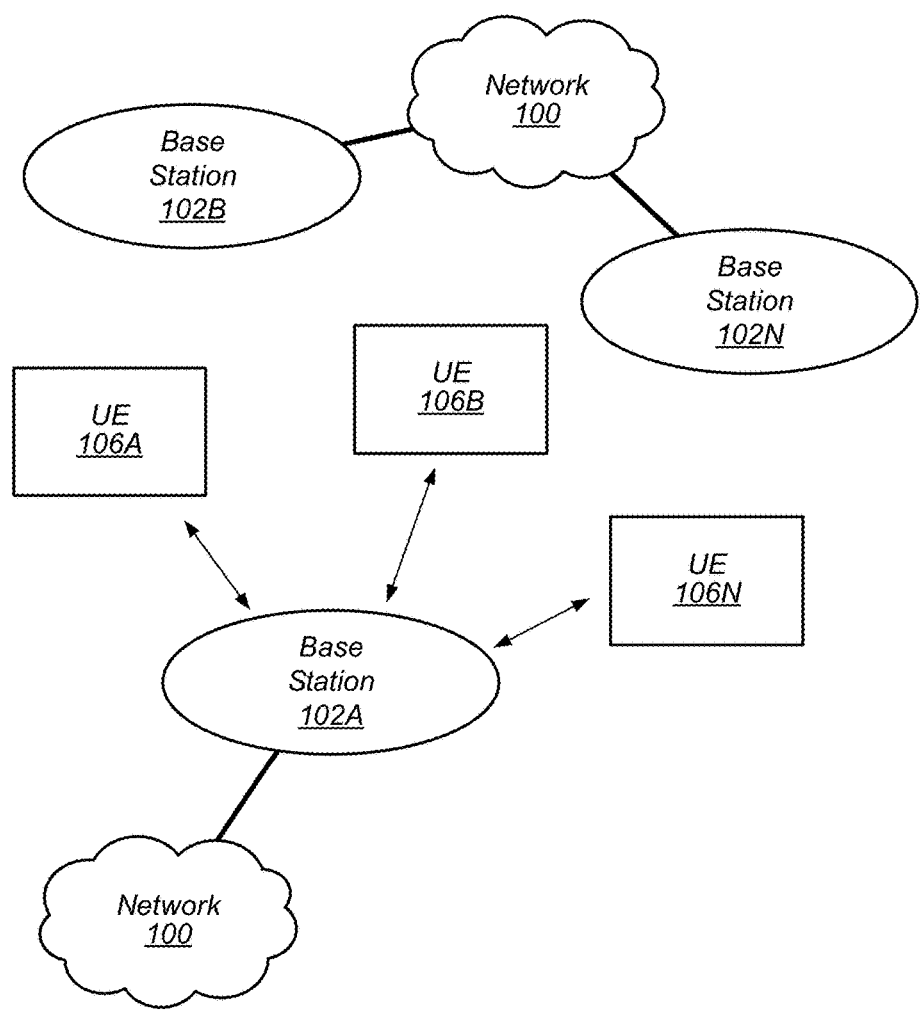
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present Patent Application:
 UE: User Equipment
 BS: Base Station
 ENB: eNodeB (Base Station)
 GSM: Global System for Mobile Communication
 UMTS: Universal Mobile Telecommunication System
 LTE: Long Term Evolution
 CS: Circuit-switched
 PS: Packet-switched
 SMS: Short Message Service
 MMS: Multimedia Messaging Service
 CSFB: Circuit-switched fallback
 MME: Mobile Management Entity
 MSC: Mobile Switching Center
 RNC: Radio Network Controller Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (e.g., smart watch, smart glasses, smart ring, smart pendant), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
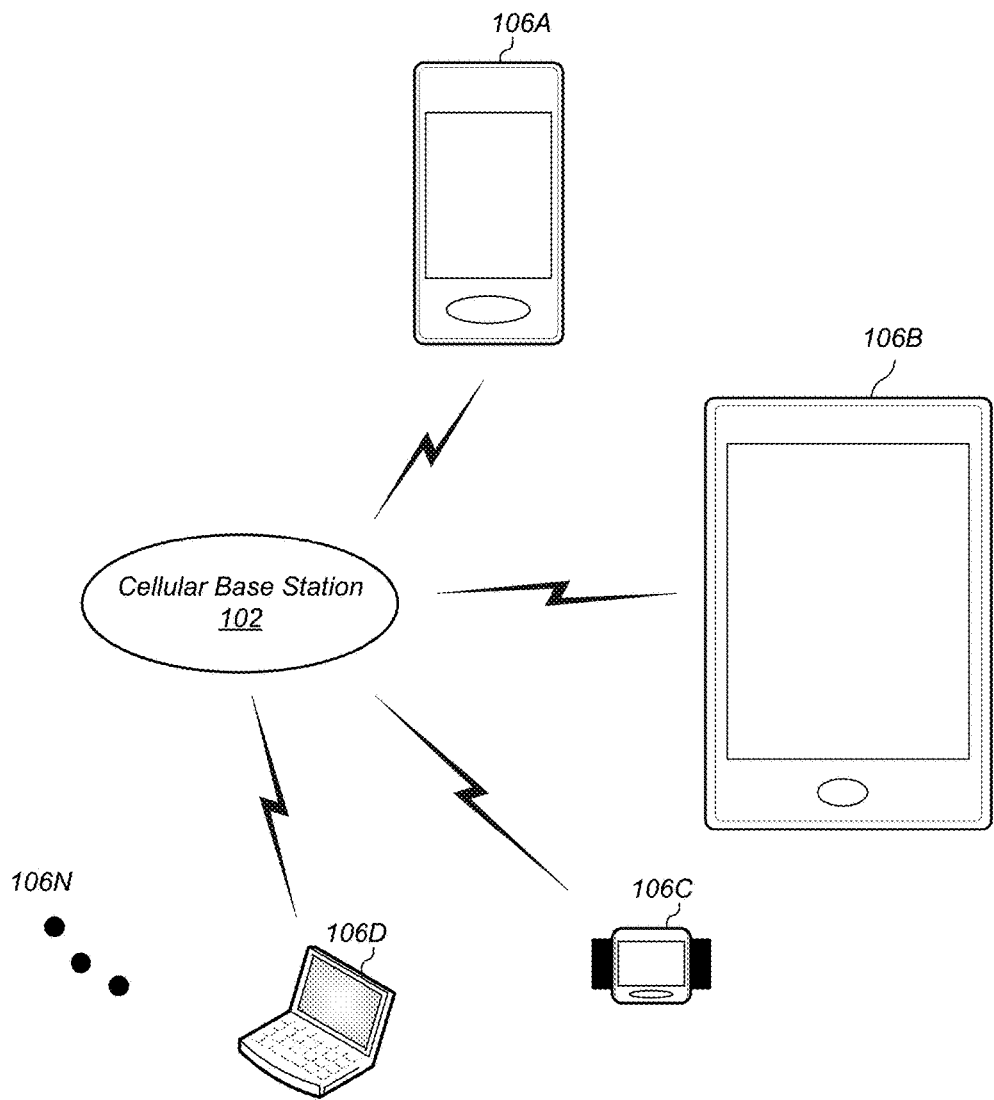
FIG. 2 illustrates a base station in communication with various user equipment (UEs) operated by a user, such as a smart phone, tablet computer, smart watch, and portable computer, according to some embodiments.
Figure 3:
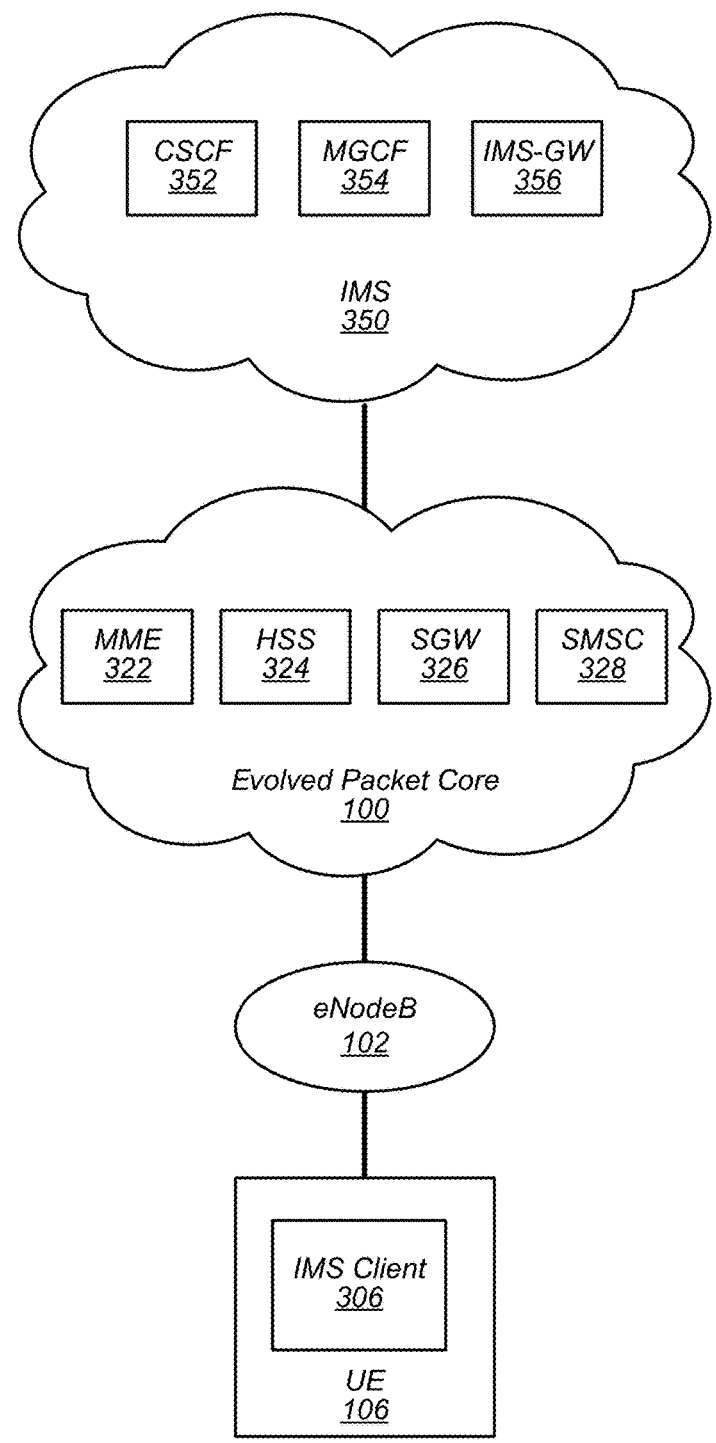
FIG. 3 illustrates an example cellular network system, according to some embodiments.

FIGS. 1-3—Communication System

FIG. 1 illustrates a simplified example wireless cellular communication system, according to some embodiments. It is noted that the system of FIG. 1 is merely one example of a possible cellular communication system, and embodiments may be implemented in any of various systems as desired.

As shown, the example wireless cellular communication system includes a base station 102A which communicates over a transmission medium with one or more user devices 106A through 106N. Each of the user devices may be referred to herein as a "user equipment" (UE). Thus, the user devices 106 are referred to as UEs or UE devices. The UEs 106A through 106N may further communicate with one or more additional base stations 102B through 102N.

The base station 102A may be a base transceiver station (BTS) or cell site, and may include hardware that enables wireless cellular communication with the UEs 106A through 106N. The base station 102A may also be equipped to communicate with a network 100. Thus, the base station 102A may facilitate communication between the UEs and/or between the UEs and the network 100. The communication area (or coverage area) of each base station may be referred to as a "cell." The base station 102A and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102A and other similar base stations operating according to the same or a different cellular communication standard may thus be provided as a network of cells, which may provide continuous or nearly continuous overlapping service to UEs 106A through 106N and similar devices over a wide geographic area via one or more cellular communication standards. Other possible wireless communication technologies include wireless local area network (WLAN or WiFi), WiMAX, etc.

In some embodiments, any of UEs 106A through 106N may be capable of communicating using multiple radio access technologies (RATs). For example, the UE 106A might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates various user equipment (UE) 106 devices (e.g., the UE devices 106A through 106N) which may be in possible communication with the base station 102, according to some embodiments. Note that as used herein, the reference number 106 may be used to refer to a UE device generically, or to UE devices collectively, and specific UE devices may be designated with respective alphabetic suffixes, e.g., 106A, 106B, and so forth. As FIG. 2 shows, this exemplary multi device system includes multiple network enabled UE devices 106, including a smart phone 106A, a tablet computer 106B, a smart watch 106C, and a laptop 106D, and may further include additional UE devices, as indicated by the ellipses and reference 106N. Note, however, that these UE devices 106 are exemplary only, and that other UE devices may be used as desired.

As defined above, the UE 106 may be a device with wireless cellular network connectivity such as a mobile phone, a hand-held device, a computer, a tablet, a smart watch, or virtually any type of wireless device, e.g., a smart ring or pendant, etc. Two or more of these UE devices 106 may belong to (e.g., be owned or operated by) a single user. For example, in one typical multi-device scenario, the user may carry a smart phone UE 106A in his pocket while also carrying or operating one or both of a tablet computer and a laptop computer. Each of these UE devices 106 may have messaging capability for receiving/sending messages, such as SMS (Short Message Service) messages, also commonly referred to as text messages, and MMS (Multimedia Messaging Service) messages. Embodiments described herein provide improved methods for selective delivery of messages to at least one of the multiple UE devices belonging to a user.

The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof. The base station, such as the processing element in the base station, may perform any of the methods described herein, or any portion of any of the method embodiments described herein. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may be configured to communicate using one or more of a first radio access technology (RAT) which provides packet-switched (PS) services and circuit-switched (CS) services. The UE may be associated with, e.g., subscribe to, a cellular carrier. Examples of cellular carries in the United States include Verizon, AT&T, Sprint, and T-Mobile.

FIG. 3 illustrates an example simplified portion of a wireless communication system that may be particularly useful for implementing packet-switched communication, such as IMS, or circuit-switched communication, according to some embodiments. For example, the wireless communication system may be used for transmitting messages among users within the system. As shown, the UE 106 may include an IP multimedia subsystem (IMS) client 306, e.g., which may be implemented in various manners, using hardware and/or software. For example, in some embodiments, software and/or hardware may implement an IMS stack that may provide desired IMS functionalities, e.g., transmission of messages over IMS, etc.

The UE 106 may be in communication with a cellular network, where the cellular network may include a base station 102, an evolved packet core (EPC) 100 and an IMS system 350, as shown. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, serving gateway (SGW) 326, and Short Messaging Service Center (SMSC) 328, although it should be noted that these devices are exemplary only. The EPC 100 may include various other devices known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may include various other devices known to those skilled in the art as well. The cellular network may include various other network devices, as desired.

Operations described herein as being performed by the cellular network may be performed by one or more of the cellular network devices shown in FIG. 3, such as one or more of base station, 102, MME 322, HSS 324, or SGW 326 in EPC 100, or CSCF 352, MGCF 354 or IMS-GW 356 in IMS system 350, among possible others which are not shown.

Figure 4:
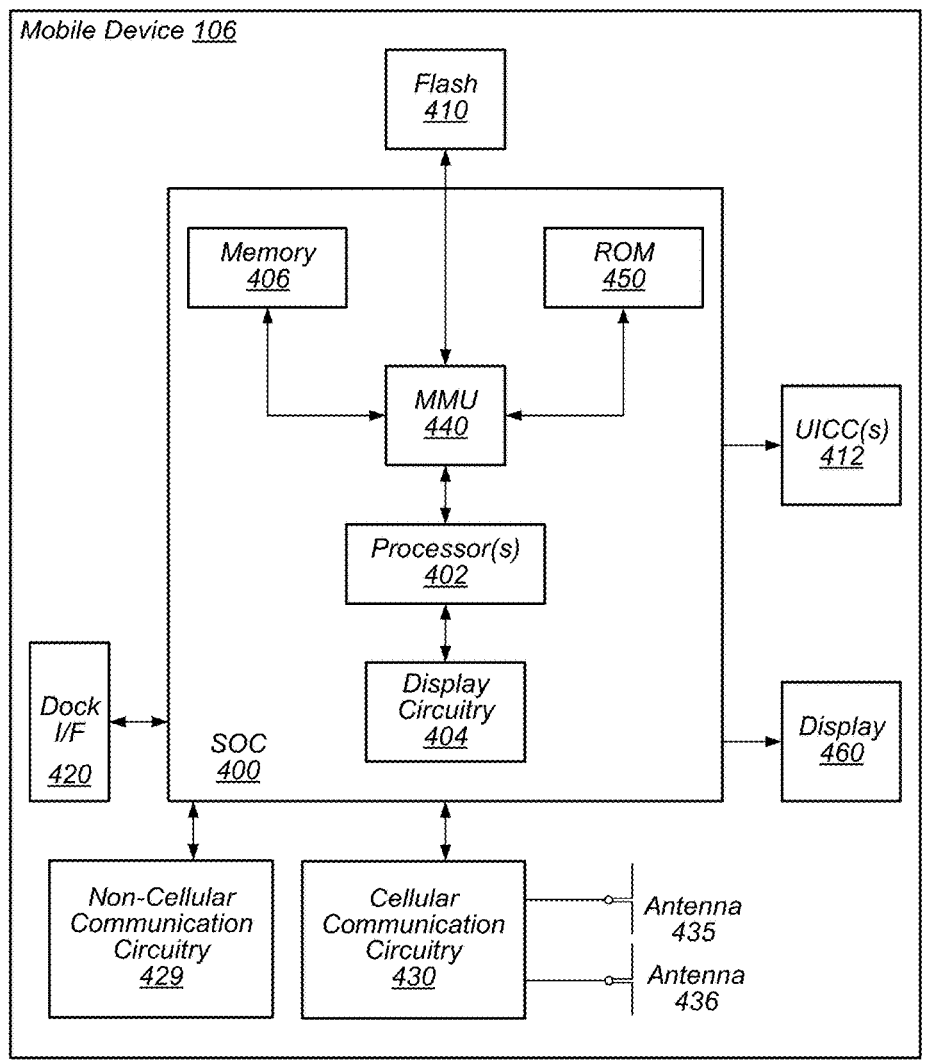
FIG. 4 illustrates an example block diagram of a UE, according to some embodiments.

FIG. 4—Example Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, Flash memory 410) and/or to other circuits or devices, such as the display circuitry 404, cellular communication circuitry 430, non-cellular communication circuitry 429, dock/connector interface (I/F) 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a dock/connector interface 420 (e.g., for coupling to a computer system), the display 460, cellular communication circuitry (e.g., for LTE, LTE-A, CDMA2000, GSM, etc.) 430, and non-cellular communication circuitry (e.g., for Bluetooth, Wi-Fi, etc.) 429.

The UE device 106 may include at least one antenna, and in some embodiments multiple antennas, for performing wireless cellular communication with base stations and/or wireless communication with other devices. For example, the UE device 106 may use antenna(s) 435 to perform the wireless cellular communication via the cellular communication circuitry 430 and may use antenna(s) 436 for other wireless communication, such as transmission/receipt of messages such as SMS messages. Although not expressly shown, the non-cellular communication circuitry 429 may also be connected to one or more of the antenna(s) 435 and 436.

As described herein, the UE 106 may include a processing element, e.g., hardware and/or software components for implementing methods according to embodiments of this disclosure. The processing element of the UE device 106 may be processor 402 configured to implement part or all of the methods described herein, e.g., by executing program instructions stored on a memory medium (e.g., a non-transitory computer-readable memory medium), such as the memory 406. In other embodiments, the UE processing element may be configured as a programmable hardware element, such as an FPGA (Field Programmable Gate Array), or as an ASIC (Application Specific Integrated Circuit).

Figure 5:
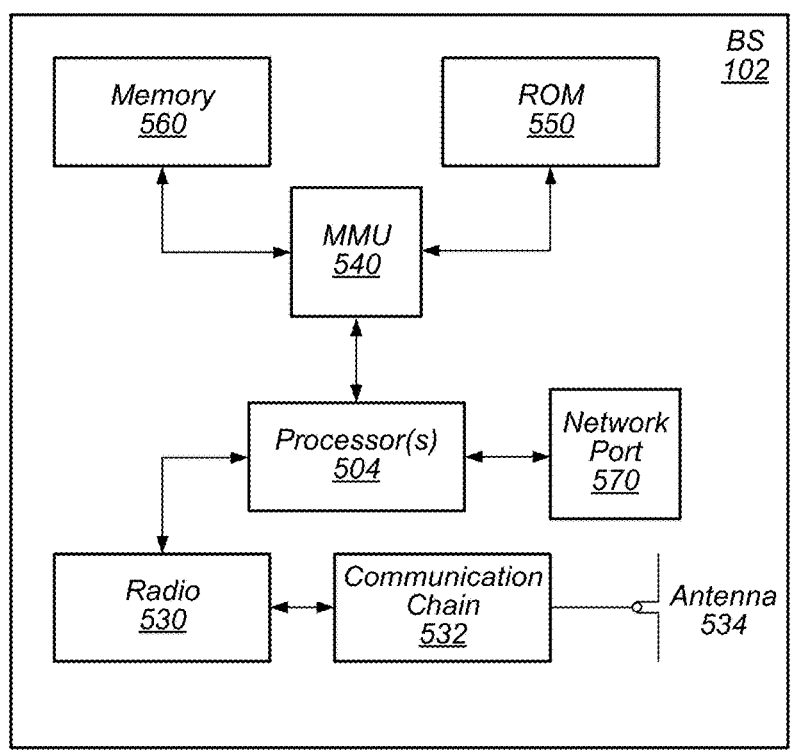
FIG. 5 illustrates an example block diagram of a base station, according to some embodiments.

FIG. 5—Base Station

FIG. 5 illustrates an exemplary block diagram of a network device, such as a base station 102, according to some embodiments. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The system shown in FIG. 5 may also be used to implement any of the cellular network devices shown in FIG. 3, although it is noted that in general network devices other than a base station would typically not include a radio 530, a communication chain 532, and an antenna 534.

The processing element, such as processor(s) 504, of the network device shown in FIG. 5 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Figure 6:
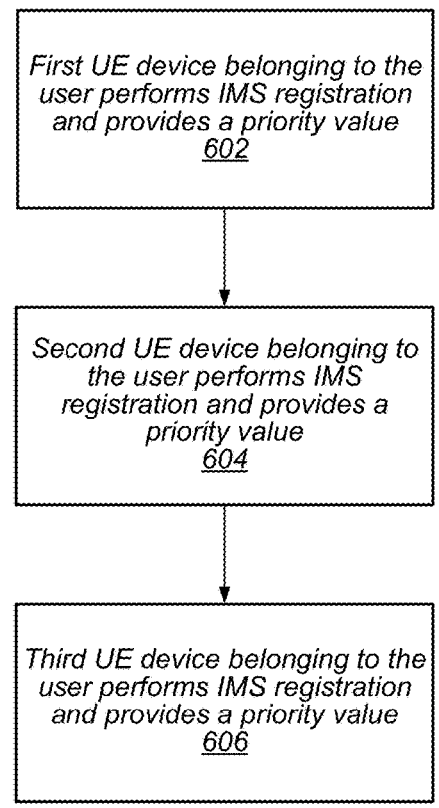
FIG. 6 is a flowchart diagram of a method by which various user equipment devices associated with a user may perform IMS registration and provide respective priority values to the network.

FIG. 6—UEs Providing Priority Values to the Network

FIG. 6 illustrates an example method by which UE devices may register with a messaging service and provide priority values in accordance with the present techniques. It should be noted that in various embodiments of the methods described below, one or more of the elements described may be performed concurrently, in a different order than shown, or may be omitted entirely. Other additional elements may also be performed as desired.

As shown, in 602, a first UE device, e.g., one of the UE devices 106 of FIG. 2, belonging to (e.g., owned or operated by) a user may perform a messaging service registration, e.g., IMS registration, and may provide a first priority value (for the first UE device), e.g., to a network, such as a cellular network. The first priority value may indicate a priority in which messages intended for the user are sent to the respective first UE device, where the first priority value is relative to other priority values of other UE devices belonging to the same user. In some embodiments, the first UE device may be a smart phone, such as an iPhone.

In 604, a second UE device, e.g., another one of the UE devices 106 of FIG. 2, belonging to the same user may perform messaging service registration, e.g., IMS registration, and may provide a second priority value (for the second UE device) to the network. The second priority value may indicate a priority in which messages intended for the user are sent to the respective second UE device, where the second priority value is relative to other priority values of other UE devices belonging to the same user. For example, the second UE device may be one of a tablet device, a wearable device, or a general purpose computer.

In 606, a third UE device, e.g., yet another one of the UE devices 106 of FIG. 2, also belonging to the same user, may perform messaging service registration, e.g., IMS registration, and may provide a third priority value (for the third UE device) to the network. The third priority value may indicate a priority in which messages intended for the user are sent to the respective third UE device, where the third priority value is relative to other priority values of other UE devices belonging to the same user.

In some embodiments, for each UE device the priority value may be included in an IMS header (or header field) in the registration request sent to the cellular network. This IMS header field may be a "new" field that is not specified according to any current telecommunication standards. Thus, a plurality of UE devices belonging to the user may each register with a messaging service and provide a respective priority value to the cellular network.

In some embodiments, each of the UE devices 106 may be configured to present a graphical user interface (GUI), whereby the user may specify or set the respective priority value for the UE device. Thus, one of the UE devices 106 may receive input, via its GUI, specifying a priority value for the UE device, and may, in response, set the priority value for the UE device according to the input. In at least some embodiments, the user may use the GUI of one of the UE devices, e.g., UE 106A, to set or change the priority values of one or more of the other UE devices. Thus, one of the UE devices 106 may receive input, via the GUI, specifying respective priority values for one or more of the other UE devices, and may communicate a specified priority value to the corresponding UE device. For example, in some embodiments, any of the UE devices 106 may be used to set the priority value of any of the other UE devices 106. In another embodiment, the user may designate one of the UE devices as a primary device, and the priority values of the other devices may only be set by accessing the GUI of the primary device or of the respective device whose priority value is being set. However, in other embodiments, setting or changing the priority value of each UE device may require accessing the GUI on the device itself.

It should be noted that other techniques for establishing each UE device's priority value (that is subsequently provided to the network by the UE devices) may be used as desired. For example, the user may set the priority value or messaging service preferences in a Settings (configuration) tool or file, and corresponding priority values may then be provided to the various UE devices, e.g., via a cloud storage system, such as iCloud™ provided by Apple, Inc. Additionally, or alternatively, the user may enter a priority or preference on each UE device, e.g., in the device's Settings (configuration). In another approach, the vendor of the UEs may provide default priority values for each UE device, e.g., where, as a default, the phone (e.g., iPhone) always has top priority, the tablet (e.g., iPad) has the next highest priority, a laptop computer has the third highest priority, and so forth, where these default priority values may be changed by the user. Note, however, that these different ways of providing/setting the priority values of the UE devices are exemplary only, and that any other techniques for providing/setting the priorities may be used as desired.

In accordance with the above, in one exemplary embodiment, the network, e.g., the cellular network, may receive a first request to perform IP Multimedia Subsystem (IMS) registration from a first user equipment (UE) device belonging to (e.g., owned or operated by) a user, where the first request to perform the IMS registration includes a first priority value for receipt of text messages intended for the user. The network may also receive a second request to perform IMS registration from a second UE device belonging to the user, where the second request to perform the IMS registration includes a second priority value for receipt of text messages intended for the user. Of course, further requests (with priority values) may be received from additional UE devices of the user, as well. For example, the method may further include receiving a third request to perform IMS registration from a third UE device belonging to the user, where the third request to perform the IMS registration includes a third priority value for receipt of messages intended for the user.

The network may store the received priority values (e.g., the first priority value and the second priority value) in a data structure in a memory medium in the network, e.g., in one or more of the network IMS and/or EPC devices of FIG. 3. In some embodiments, the priority values may be stored in a priority data structure such as a queue or table or other suitable data structure. In some scenarios, e.g., if the network has not yet received a priority value from a UE belonging to a user, the network may store a default priority value (e.g., a low priority value) for the UE, or may infer a priority value, e.g., based on a device type of the UE. Storing the received priority values in the data structure may, in some scenarios, be performed in response to the network determining that the UE devices associated with the priority values belong to the same user. For example, the network may determine that the UE devices "belong" to the same user if the UE devices are registered (e.g., with the network or with a third party to which the network has access) to receive messages for the user, e.g., if the devices are registered to, or otherwise associated with, the same telephone number, user account, or user ID.

The network may receive a message intended for the user, and may deliver the message to one of the UE devices (e.g., the first UE device or the second UE device) based on the received/stored (e.g., first, second, etc.) priority values. Thus, the UE device priority values may be used to deliver messages, e.g., SMS or MMS messages, to the UEs in accordance with the present techniques, as described in more detail with reference to the method of FIGS. 7-12.

Figure 7:
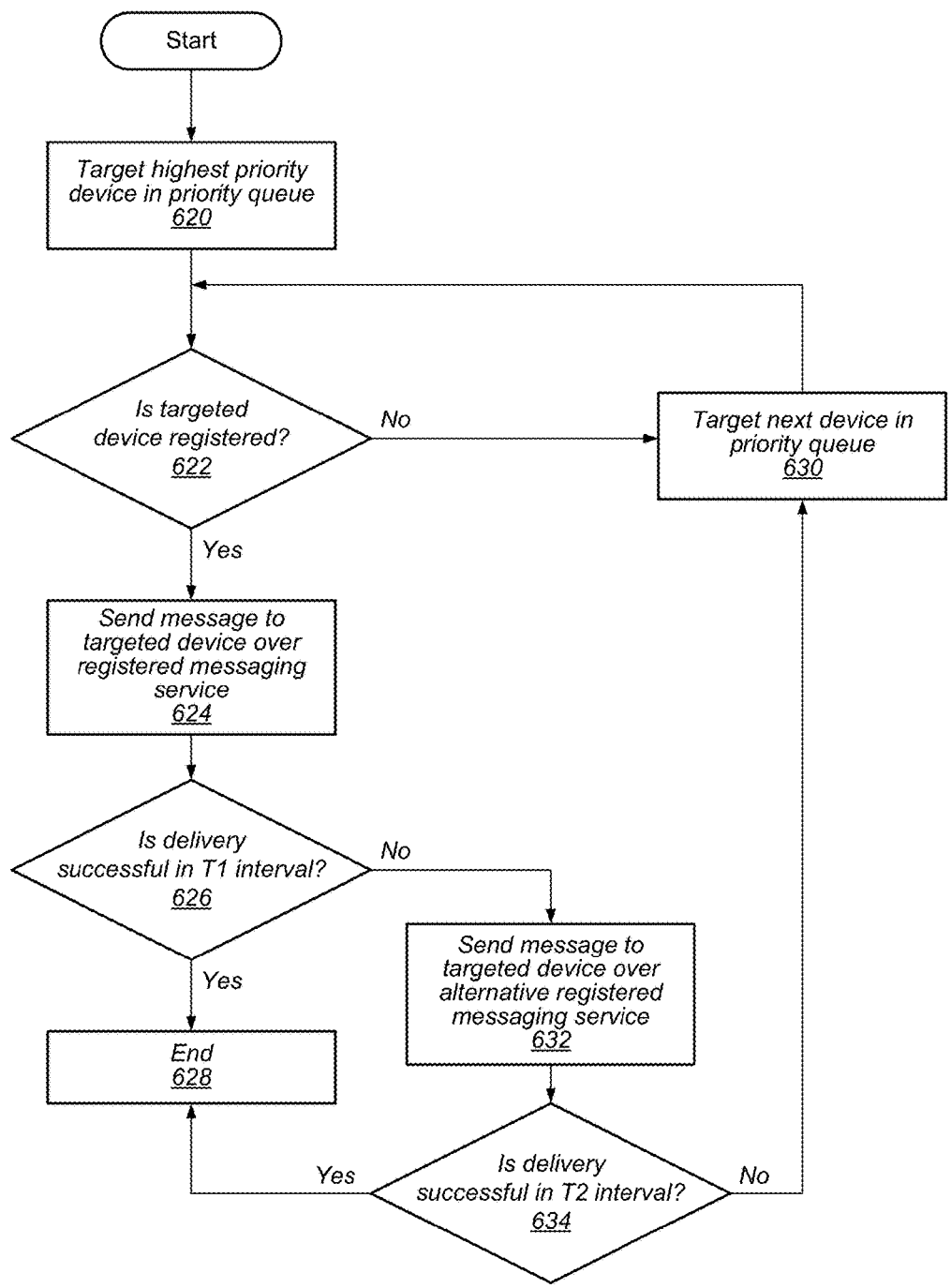
FIG. 7 is a flowchart diagram of a method by which a carrier network may selectively provide a messaging service message to one of a user's devices based on a priority scheme, according to some embodiments.

FIG. 7—Providing SMS Messages to a User

FIG. 7 illustrates an example method by which a cellular network (also called a carrier network) may selectively provide messages (e.g., SMS messages) to at least one UE device of a user who owns or operates multiple UE devices capable of message communication, according to some embodiments. As used herein, the term "message" refers to a message that is intended for a user, where the message is sent using a messaging capability for receiving/sending messages, such as SMS (Short Message Service) or MMS (Multimedia Messaging Service), or other similar messaging service. Example messages include SMS messages, also commonly referred to as text messages, and MMS (Multimedia Messaging Service) messages. As used herein, a message may be considered to be "intended" for a user if it is addressed with address information (e.g., a telephone number, user account, or user ID) registered to, or otherwise associated with, the user or a UE device belonging to the user.

The steps in FIG. 7 may be performed by any of various devices in the cellular network, such as in the MME, HSS, base station, etc., or may be performed by some combination of these devices. The method of FIG. 7 presumes that the network has stored priority information for one or more UE devices belonging to a user—e.g., one or more UE devices of the user have provided priority information to the network as described above in FIG. 6.

In 620, the method may "target" the highest priority device in a priority queue as a recipient device for receiving a message directed to the user. In other words, the method may identify a UE device having the highest priority from among the one or more UE devices of the user for which the network has stored priority information. Note that method element 620 may be performed in response to reception of a message (e.g., by the network or a specific network component) that is to be delivered to the user (via one of the user's UE devices 106).

In 622, the method may determine if the targeted UE device is registered with a messaging service, e.g., IMS. If the targeted UE device is registered, then in 624, the message, e.g., an SMS or MMS message, may be sent to the targeted UE device over a registered messaging service, e.g., over IMS, and the method may proceed to method element 626. Alternatively, if the targeted UE device is not registered (e.g., is turned off), then the method may proceed to method element 630, described below.

As FIG. 7 further indicates, in 626, a determination may be made as to whether the delivery of 624 was successful within a time interval T1. If the delivery was successful, the method may terminate (e.g., do nothing further), as indicated in 628. Here, since the message was successfully delivered in 626, no further action is required to further attempt to deliver the message.

Conversely, if in 626 the delivery was not successful, the network may attempt to send the message to the targeted UE device over an alternative registered messaging service, e.g., over CS (Circuit Switched messaging service) or using a service gateway (SG), as indicated in 632. In other words, the method may attempt to send the message to the targeted UE device via a secondary or "backup" messaging service.

In 634, the method may determine if the delivery of the message over the alternative registered messaging service was successful within a time interval T2, and if so, the method may terminate, as shown in 628. Here again, if delivery of the message was successful using the alternate registered messaging service, then no further action is required to attempt to further deliver the message. If in 634 the message delivery was determined to not be successful, the method may proceed to method element 630.

As shown, in 630, the method may target the next highest priority device, e.g., the next UE device in the priority queue (or other data structure), and then return to element 622 as discussed above. Specifically, since the attempted delivery of the message to the previously targeted UE device (e.g., the highest priority device) has failed in one or more instances (failed as determined in 622 or 626 and 634), the network may attempt to send the message to the UE device with the next highest priority. This cycle may continue, e.g., until delivery is successful or all known devices of the user have been attempted.

The above method may be repeated for subsequent messages intended for the user.

Thus, in some embodiments of the present techniques, as described above, when each device performs registration, e.g., IMS registration, it may indicate a priority value, e.g., a messaging service priority value in SIP signaling to the network. The network may maintain and use this relative priority when forwarding an incoming message, and may generally first attempt to send the message to the highest priority registered device (e.g., over IP, followed by an attempted delivery over a CS network), followed by an attempt to the second priority UE device, and so on.

Figure 8:
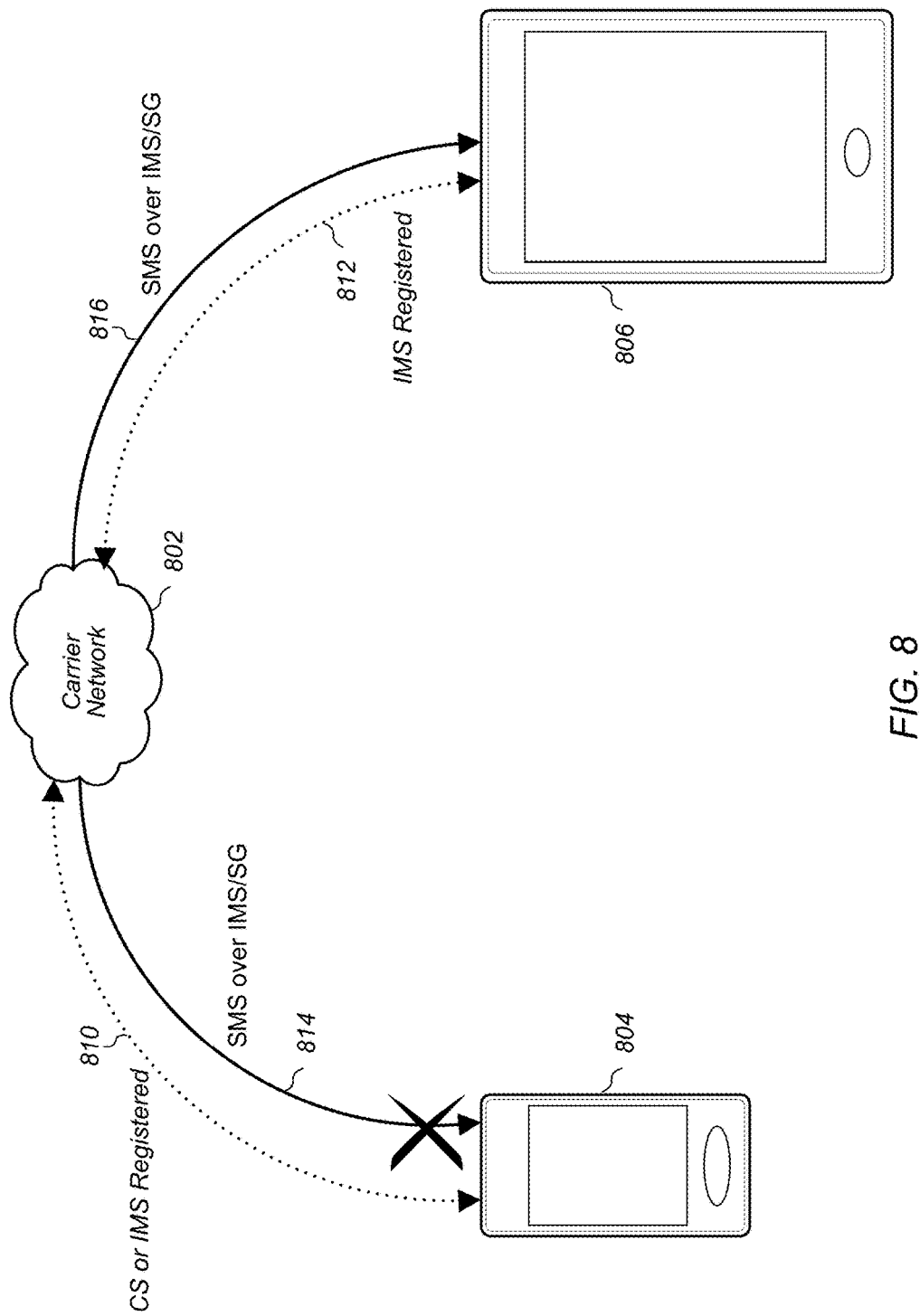
FIGS. 8-9 illustrate selective provision of a message to a user's devices according to some embodiments.
Figure 9:
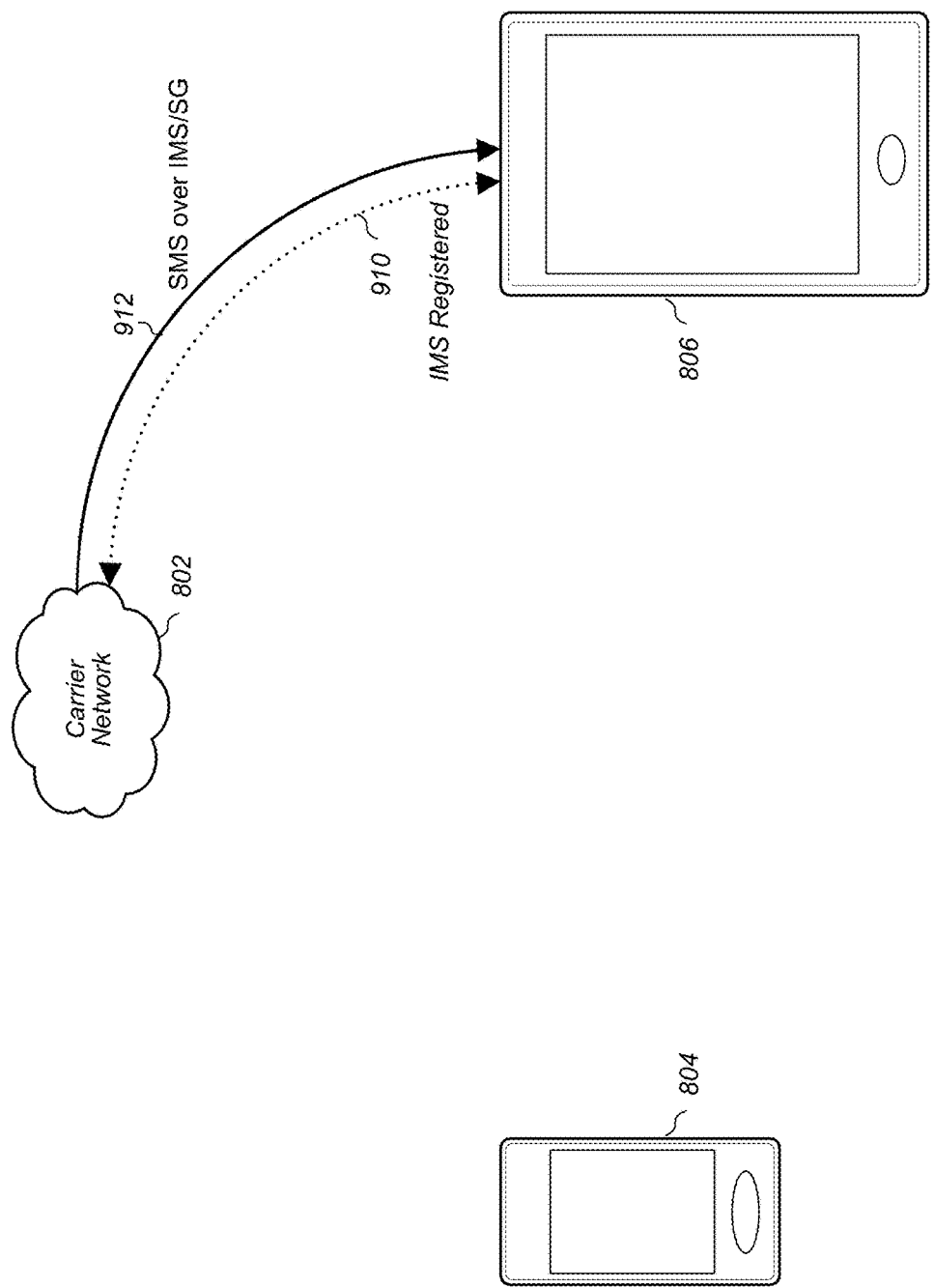

FIGS. 8-9—Providing an SMS Message Sequentially to a User's Devices

As noted above, the network may use the UE device priority values to deliver messages, e.g., SMS or MIMS messages, to the UEs in accordance with the present techniques. FIGS. 8-9 are shown using SMS as an example, but these figures apply to any of various types of messages, such as SMS or MMS, or similar messaging services.

FIG. 8 illustrates an exemplary sequential approach to message delivery in a multi device configuration or system, according to some exemplary embodiments in which the UE devices belonging to a user include a smart phone 804 and a tablet computer 806, each of which may be a UE device such as the UE 106 described above.

As shown in FIG. 8, at communication(s) 810 the smart phone 804 may register with a messaging service (e.g., IMS or CS) of the carrier network 802. As described above, the communication(s) 810 may include a priority value for the smart phone 804. At communication(s) 812, the tablet computer 806 may also register with the messaging service of the carrier network 802. The communication(s) 812 may include a priority value for the tablet computer 806. In this particular example, the priority value of the smart phone 804 is higher than that of the tablet 806. In some scenarios, the communications 810 and 812 may further indicate that the smart phone 804 and the tablet 806 belong to the same user. In other scenarios, that information may be obtained by the carrier network at another time and/or from other sources. For example, if the tablet 806 does not provide a priority value, the network 802 may infer that the tablet 806 has a lower priority than the smart phone 804, which did provide a priority value, or, if neither device provides a priority value, the network 802 may by default infer a higher priority, e.g., for the smart phone 804.

As shown in FIG. 8, when a message for the user is received by the carrier network 802, the carrier network 802 may, at communication(s) 814, attempt to send the message (e.g., over IMS/SG) first to the smart phone 804, based on the relative priority of the UE devices. In some embodiments, the network may determine that the smart phone 804 is registered (e.g., still registered) prior to attempting to send the message. In the scenario of FIG. 8, the attempted delivery of the message to the smart phone 804 fails, as indicated by the large X. For example, the smart phone 804 may be in a dead zone, or subject to temporary interference from another device, the weather, etc.

In response to the delivery failure at communication(s) 814, the network 802 may, at communication(s) 816, attempt to send the message (e.g., over IMS/SG) to the tablet 806. For example, the network 802 may determine that the tablet 806 is the next highest priority registered UE device belonging to the user. In some embodiments, the network may determine that the tablet 806 is registered (e.g., still registered) prior to attempting to send the message. In the scenario of FIG. 8, the attempted delivery of the message to the tablet 806 succeeds. In another scenario, the attempted delivery of the message to the tablet 806 may fail, in which case the network 802 may attempt to send the message to the next highest priority device belonging to the user or, e.g., if no additional devices belonging to the user are registered, the network 802 may report that delivery of the message has failed.

In summary, per FIG. 8, the network may attempt to send the message sequentially to the smart phone 804 first, and if that fails, then to the tablet 806, which is IMS registered, based on the relative priority values for the devices stored by the network 802 (e.g., received by the network 802 during registration).

FIG. 9 illustrates an exemplary situation in which only one of the user's UE devices is registered with a messaging service. Specifically, as shown in FIG. 9, at communication(s) 910 the tablet 806 may register with a messaging service (e.g., IMS or CS) of the carrier network 802. As described above, the communication(s) 910 may include a priority value for the smart phone 804. However, in the scenario of FIG. 9, the smart phone 804 is not currently registered with the messaging service of the network 802. In this case, the message is first (and possibly only) sent to the tablet 806 over IMS at communication(s) 912.

In the scenario of FIG. 9, the attempted delivery of the message to the tablet 806 succeeds. In another scenario, the attempted delivery of the message to the tablet 806 may fail, in which case the network 802 may attempt to send the message to the next highest priority device belonging to the user or, e.g., if no additional devices belonging to the user are registered, the network 802 may report that delivery of the message has failed.

In some scenarios consistent with FIG. 9, the network 802 may have stored priority values for each of the smart phone 804 and the tablet 806, and the priority value of the smart phone 804 may be higher than that of the tablet 806. For example, the smart phone 804 may have previously registered (and then de-registered) with the network 802, or the network 802 may have received a priority value for the smart phone 804 at another time and/or from another source (e.g., from the tablet 806). However, in response to determining that the smart phone 804 is not currently registered, the network 802 may not attempt to send the message to the smart phone 804, and may instead first attempt to send the message to the tablet 806, as shown in FIG. 9, regardless of the relative priority values of the smart phone 804 and the tablet 806.

It should be understood that the example scenarios of either of FIG. 8 or FIG. 9 may be implemented in conjunction with the methods of FIG. 6 and/or FIG. 7.

Figure 10:
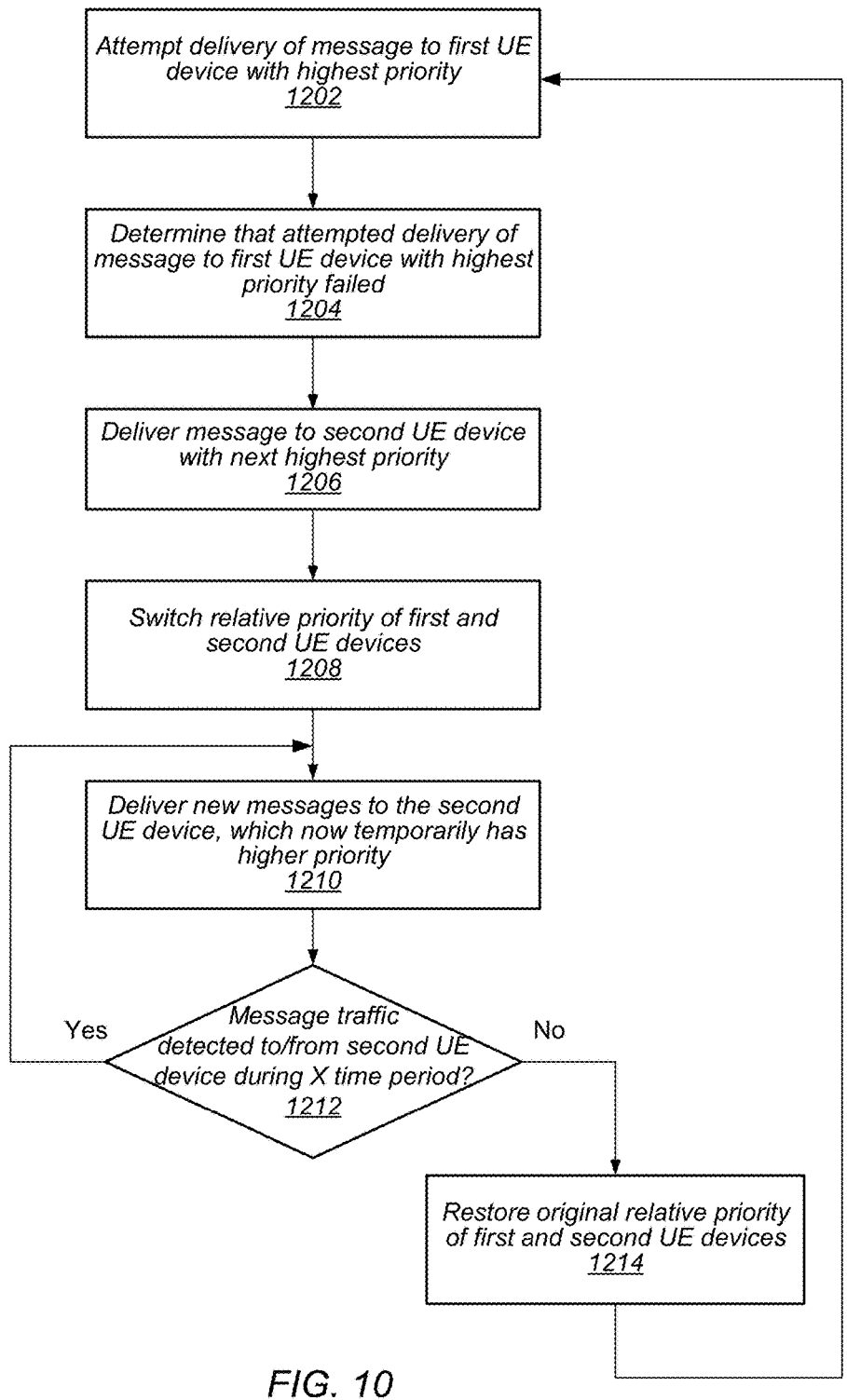
FIG. 10 is a flowchart diagram of a method by which a network temporarily adjusts relative priorities of the user's UE devices when the highest priority UE device becomes unavailable, according to some embodiments.

FIG. 10—Handling Stale Registration State

In some situations, if a UE device, e.g., a phone, goes offline (powers down) without a graceful de-registration, the cellular network (e.g., the HSS) may continue to show a valid registration from the UE device. If the UE device is the highest priority device, for all messages, there will be a delay in delivering the messages to the UE device with the next highest priority, since the network spends time attempting to deliver the messages first to the highest priority device, whose registration is stale (in effect, but not valid). FIG. 10 presents a method for handling this issue. More specifically, FIG. 10 is a flowchart of a method for handling stale registration state, e.g., at the HSS.

As FIG. 10 shows, in 1202, the network may attempt to deliver a message to a first UE device, e.g., a phone, where the first UE device has the highest priority of a plurality of UE devices belonging to (e.g., owned or operated by) the user.

In 1204, the network may determine that the attempted delivery of the message to the first UE device with the highest priority failed. This failure may be due, e.g., to the UE having been turned off or being in a bad coverage area.

In 1206, the network may successfully deliver the message to a second UE device that has the next highest priority, e.g., a tablet. In some scenarios, method elements 1202-1206 may be performed consistently with the methods of FIG. 6 and/or FIG. 7, and/or consistently with the example scenario of FIG. 8.

In 1208, the network may at least temporarily switch the relative priority of the first UE device and the second UE device. In other words, in response to the delivery failure to the first UE device (with the highest priority) and/or the delivery success to the second UE device, the network may temporarily adjust the relative priorities of the first and second devices, to make the priority level of the second UE device the highest priority level. This change in relative priority may be achieved in any of various ways. For example, the priority values of the two devices or their relative positions in a priority queue may simply be swapped, or the priority level of the first UE device may be changed to be lower than that of the second UE device, and/or the priority level of the second UE device may be changed to be higher than that of the first UE device.

In 1210, for at least a period of time, delivery of new messages may be first attempted to the second UE device, which now temporarily has higher priority than the first UE device. For example, since message communication, such as text message or multimedia message communication, is typically bursty in nature, it may be desirable for the second UE device to retain the higher priority until the current text "conversation" has completed. Thus, if message traffic with (i.e., to/from) the second UE device is detected during the specified time period X (see "Yes" branch of 1212), the method may return to method element 1210 and proceed as described above where delivery of new messages continues to be first attempted to the second UE device. This may help ensure that the remainder of the current messaging conversation is delivered to the second UE device, which the user is presumably currently using.

In 1212, the network may determine whether message traffic (e.g., messages) with the second UE device is detected during a specified time period X. For example, the network may essentially be determining whether the current message conversation has ended. If, in 1212, messaging traffic with (i.e., to/from) the second UE device is not detected during the specified time period X (see the "No" branch of 1212), then the method may proceed to 1214, in which the network may restore the original relative priority of the first UE device and the second UE device. In other words, in response to detecting no further messaging traffic with the second UE device during the specified time period X, the network may change the relative priority values of the first and second UE devices such that the first UE device again has a higher priority level than the second UE device. For example, the network may restore the priority values of each of the first UE device and the second UE device to the values stored prior to method element 1208. The method may then return to method element 1202, and proceed as described above.

Presenting some embodiments of the above technique in a slightly different way, when the first priority value (of the first UE device) is higher than the second priority value (of the second UE device), delivering the message may include attempting to deliver the message to the first UE device, since the first priority value is higher than the second priority value, and in response to failure of the attempting to deliver the message to the first UE device, delivering the message to the second UE device. In response to the failure of the attempting to deliver the message to the first UE device and the successful delivery of the message to the second UE device, the network may change at least one of the first priority value or the second priority value such that the second priority value becomes at least temporarily higher than the first priority value.

Following the phone/tablet example of FIG. 8, in some embodiments, once the message is delivered to the tablet 806 (e.g., after unsuccessful delivery to the smart phone 804), the network may switch the relative priority for messaging for the two devices, and (temporarily) treat the tablet 806 as the highest priority device. Moreover, given the bursty nature of SMS traffic, the network may continue to deliver all subsequent messages directly to the tablet 806 until there is no messaging traffic with (i.e., to/from) the tablet 806 detected for the specified time period X, e.g., for timer X. Once the specified time period X elapses, e.g., the timer X expires, it is assumed that the current messaging conversation has completed, and the relative priority of the two devices is changed back to its original state, e.g., the (higher) relative priority may be switched back to the smart phone 804.

In some embodiments, on a subsequent re-registration boundary, if the phone does not register with the messaging service, the network (e.g., the HSS) may clear the state for the phone. In other words, if the phone, whose registration was stale, doesn't register, then the network may clear the phone's registration state, thus removing the stale registration.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a cellular network, the method comprising:
   receiving, from a first user equipment (UE) device associated with a user identifier, a first request to perform IP Multimedia Subsystem (IMS) registration, wherein the first request to perform the IMS registration includes a first priority value for receipt of messages directed to the user identifier;
   receiving, from a second UE device associated with the user identifier, a second request to perform IMS registration, wherein the second request to perform the IMS registration includes a second priority value for receipt of messages directed to the user identifier;
   receiving a message directed to the user identifier;
   attempting to deliver the message to the first UE device in response to determining that the first priority value is higher than the second priority value;
   in response to failure of the attempting to deliver the message to the first UE device, delivering the message to the second UE device; and in response to the delivering the message to the second UE device, changing at least one of the first priority value or the second priority value such that the second priority value becomes higher than the first priority value for a first period of time, wherein messages directed to the user identifier received by the network during the first period of time are attempted to be first delivered to the second UE device in response to determining that the second priority value is higher than the first priority value during the first period of time, wherein the first period of time lasts until the cellular network detects no message traffic with the second UE device for a predetermined time period.

2. The method of claim 1, further comprising:
receiving a second message directed to the user identifier after said changing; and
attempting to first deliver the second message to the second UE device in response to determining that the second priority value is higher than the first priority value.

3. The method of claim 1, further comprising:
after the first period of time expires, changing at least one of the first priority value or the second priority value such that the first priority value is higher than the second priority value;
wherein messages received by the network after the first period of time expires are attempted to be first delivered to the first UE device in response to determining that the first priority value is higher than the second priority value after the first period of time expires.

4. The method of claim 1, further comprising:
on a subsequent re-registration boundary, if the first UE device has not performed IMS registration since the failure of the attempting to deliver the message to the first UE device, the network clearing a stored state of the first UE device, wherein said clearing clears the first priority value of the first UE device.

5. The method of claim 1, further comprising:
receiving a third request to perform IMS registration from a third UE device associated with the user identifier, wherein the third request to perform the IMS registration includes a third priority value for receipt of messages directed to the user identifier.

6. The method of claim 1,
wherein the first UE device is a smart phone, and wherein the second UE device is one of a tablet device, a wearable device, or a general purpose computer.

7. The method of claim 1,
wherein said attempting to deliver the message comprises:
attempting to deliver the message to the first UE device using an IMS messaging service; and
in response to failure of the attempting to deliver the message to the first UE device using the IMS messaging service, attempting to deliver the message to the first UE device over a circuit-switched network.

8. The method of claim 7, further comprising:
in response to failure of the attempting to deliver the message to the first UE device using the circuit-switched network, delivering the message to the second UE device.

9. The method of claim 7,
wherein said attempting to deliver the message to the first UE device using the IMS messaging service is performed for a second period of time;
wherein said attempting to deliver the message to the first UE device using the circuit-switched network is performed for a third period of time.

10. The method of claim 1,
wherein the message is one of a SMS (Short Message Service) message or a MMS (Multimedia Messaging Service) message.

11. A method performed by a cellular network, the method comprising:
receiving a first message directed to a user identifier;
determining a plurality of user equipment (UE) devices registered to receive messages directed to the user identifier;
retrieving priority information associated with each of the plurality of UE devices, wherein the priority information comprises at least a first priority value for a first UE device of the plurality of UE devices and a second priority value for a second UE device of the plurality of UE devices;
attempting to first deliver the first message to the first UE device in response to determining that the first priority value is higher than the second priority value;
in response to failure of the attempting to first deliver the first message to the first UE device, attempting to deliver the first message to the second UE device;
in response to the delivering the first message to the second UE device, changing at least one of the first priority value or the second priority value such that the second priority value becomes higher than the first priority value for a first period of time, wherein the first period of time lasts until the cellular network detects no message traffic with the second UE device for a predetermined time period;
receiving a second message directed to the user identifier during the first period of time; and
attempting to deliver the second message to the second UE device in response to determining that the second priority value is higher than the first priority value.

12. The method of claim 11,
wherein said attempting to first deliver the first message to the first UE device is performed for a second period of time;
wherein said attempting to deliver the first message to the second UE device is performed for a third period of time.

13. The method of claim 11,
wherein the first message is one of a SMS (Short Message Service) message or a MMS (Multimedia Messaging Service) message.

14. The method of claim 11, wherein said attempting to first deliver the first message to the first UE device comprises:
attempting to first deliver the first message using an IMS messaging service; and
in response to failure of the attempting to first deliver the first message to the first UE device using the IMS messaging service, attempting to deliver the first message to the first UE device over a circuit-switched network or using a serving gateway.

15. A method performed by a cellular network, the method comprising:
receiving a first message directed to a user identifier;
determining a plurality of user equipment (UE) devices registered to receive messages directed to the user identifier;
retrieving priority information associated with each of the plurality of UE devices, wherein the priority information comprises at least a first priority value for a first UE device of the plurality of UE devices and a second priority value for a second UE device of the plurality of UE devices;

attempting to first deliver the first message to the first UE device in response to determining that the first priority value is higher than the second priority value;

in response to failure of the attempting to first deliver the first message to the first UE device, attempting to deliver the first message to the second UE device;

in response to the delivering the first message to the second UE device, changing at least one of the first priority value or the second priority value such that the second priority value becomes at least temporarily higher than the first priority value; and on a subsequent re-registration boundary, if the first UE device has not performed IMS registration since the failure of the attempting to deliver the message to the first UE device, the network clearing a stored state of the first UE device, wherein said clearing clears the first priority value of the first UE device.

16. The method of claim 15, wherein the first message is one of a SMS (Short Message Service) message or a MMS (Multimedia Messaging Service) message.

17. The method of claim 15, wherein said attempting to first deliver the first message to the first UE device comprises:

attempting to first deliver the first message using an IMS messaging service; and in response to failure of the attempting to first deliver the first message to the first UE device using the IMS messaging service, attempting to deliver the first message to the first UE device over a circuit-switched network or using a serving gateway.

* * * * *